US008738516B1

(12) United States Patent
Dean et al.

(10) Patent No.: US 8,738,516 B1
(45) Date of Patent: May 27, 2014

(54) DEBT SERVICES CANDIDATE LOCATOR

(71) Applicant: Consumerinfo.com, Inc., Costa Mesa, CA (US)

(72) Inventors: Michael John Dean, Torrance, CA (US); Mark Joseph Kapczynski, Santa Monica, CA (US)

(73) Assignee: Consumerinfo.com, Inc., Costa Mesa, CA (US)

( * ) Notice: Subject to any disclaimer, the term of this patent is extended or adjusted under 35 U.S.C. 154(b) by 0 days.

(21) Appl. No.: 13/651,127

(22) Filed: Oct. 12, 2012

Related U.S. Application Data

(60) Provisional application No. 61/546,898, filed on Oct. 13, 2011.

(51) Int. Cl.
*G06Q 40/00* (2012.01)
(52) U.S. Cl.
USPC .............................................. 705/38; 705/40
(58) Field of Classification Search
USPC ..................................................... 705/10–44
See application file for complete search history.

(56) References Cited

U.S. PATENT DOCUMENTS

| | | | |
|---|---|---|---|
| 3,316,395 A | 4/1967 | Lavin et al. | |
| 4,736,294 A | 4/1988 | Gill | |
| 4,876,592 A | 10/1989 | Von Kohorn | |
| 4,895,518 A | 1/1990 | Arnold | |
| 5,034,807 A | 7/1991 | Von Kohorn | |
| 5,259,766 A | 11/1993 | Sack | |
| 5,262,941 A | 11/1993 | Saladin | |
| 5,274,547 A | 12/1993 | Zoffel et al. | |
| 5,590,038 A | 12/1996 | Pitroda | |
| 5,611,052 A | 3/1997 | Dykstra et al. | |
| 5,615,408 A | 3/1997 | Johnson | |
| 5,640,577 A | 6/1997 | Scharmer | |
| 5,659,731 A | 8/1997 | Gustafson | |
| 5,692,107 A | 11/1997 | Simoudis et al. | |
| 5,704,029 A | 12/1997 | Wright, Jr. | |
| 5,732,400 A | 3/1998 | Mandler | |
| 5,748,098 A | 5/1998 | Grace | |

(Continued)

FOREIGN PATENT DOCUMENTS

| | | |
|---|---|---|
| EP | 0 869 652 | 10/1998 |
| EP | 0 913 789 | 5/1999 |

(Continued)

OTHER PUBLICATIONS

Collins, Michael J.; Exploring the Design of Financial Counseling for Mortgage Borrowers in Default, Journal of Family and Economic Issues, Springer Science+Business Media, pp. 207-226, Mar. 13, 2007.

(Continued)

*Primary Examiner* — Frantzy Poinvil
(74) *Attorney, Agent, or Firm* — Knobbe Martens Olson & Bear, LLP

(57) ABSTRACT

Methods and systems are disclosed that identify and locate debt settlement candidates based on credit data associated with the consumer. For example, candidacy may be based on a debt score, generated by an assessment of the consumer's credit data. Credit data may include the consumer's credit score rank, credit score, revolving credit to debit ratio, credit available, delinquent accounts, negative accounts, instances of negative information on their credit report, public record data, average account age, debit, or a combination thereof.

9 Claims, 9 Drawing Sheets

(56) References Cited

U.S. PATENT DOCUMENTS

| | | |
|---|---|---|
| 5,774,883 A | 6/1998 | Andersen |
| 5,793,972 A | 8/1998 | Shane |
| 5,822,751 A | 10/1998 | Gray et al. |
| 5,825,884 A | 10/1998 | Zdepski et al. |
| 5,832,068 A | 11/1998 | Smith |
| 5,844,218 A | 12/1998 | Kawan et al. |
| 5,875,236 A | 2/1999 | Jankowitz |
| 5,878,403 A | 3/1999 | DeFrancesco |
| 5,881,131 A | 3/1999 | Farris et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,966,695 A | 10/1999 | Melchione et al. |
| 5,978,780 A | 11/1999 | Watson |
| 5,995,947 A | 11/1999 | Fraser et al. |
| 6,029,149 A | 2/2000 | Dykstra et al. |
| 6,038,551 A | 3/2000 | Barlow et al. |
| 6,064,987 A | 5/2000 | Walker |
| 6,070,141 A | 5/2000 | Houvener |
| 6,070,147 A | 5/2000 | Harms et al. |
| 6,073,140 A | 6/2000 | Morgan et al. |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,128,599 A | 10/2000 | Walker |
| 6,128,602 A | 10/2000 | Northington et al. |
| 6,128,603 A | 10/2000 | Dent |
| 6,157,927 A | 12/2000 | Schaefer et al. |
| 6,202,053 B1 | 3/2001 | Christiansen et al. |
| 6,249,770 B1 | 6/2001 | Erwin et al. |
| 6,311,169 B2 | 10/2001 | Duhon |
| 6,324,524 B1 | 11/2001 | Lent et al. |
| 6,330,575 B1 | 12/2001 | Moore |
| 6,405,173 B1 | 6/2002 | Honarvar |
| 6,405,181 B2 | 6/2002 | Lent et al. |
| 6,446,200 B1 | 9/2002 | Ball et al. |
| 6,457,012 B1 | 9/2002 | Jatkowski |
| 6,523,022 B1 | 2/2003 | Hobbs |
| 6,523,041 B1 | 2/2003 | Morgan et al. |
| 6,567,791 B2 | 5/2003 | Lent et al. |
| 6,622,131 B1 | 9/2003 | Brown et al. |
| 6,658,393 B1 | 12/2003 | Basch et al. |
| 6,748,426 B1 | 6/2004 | Shaffer et al. |
| 6,766,327 B2 | 7/2004 | Morgan, Jr. et al. |
| 6,804,346 B1 | 10/2004 | Mewhinney |
| 6,910,624 B1 | 6/2005 | Natsuno |
| 6,934,714 B2 | 8/2005 | Meinig |
| 6,950,807 B2 | 9/2005 | Brock |
| 6,954,757 B2 | 10/2005 | Zargham et al. |
| 6,962,336 B2 | 11/2005 | Glass |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,988,085 B2 | 1/2006 | Hedy |
| 7,028,001 B1 | 4/2006 | Muthuswamy et al. |
| 7,035,855 B1 | 4/2006 | Kilger et al. |
| 7,047,251 B2 | 5/2006 | Reed et al. |
| 7,050,989 B1 | 5/2006 | Hurt et al. |
| 7,076,462 B1 | 7/2006 | Nelson et al. |
| 7,076,475 B2 | 7/2006 | Honarvar |
| 7,133,935 B2 | 11/2006 | Hedy |
| 7,143,063 B2 | 11/2006 | Lent |
| 7,181,418 B1 | 2/2007 | Zucker et al. |
| 7,184,974 B2 | 2/2007 | Shishido |
| 7,185,016 B1 | 2/2007 | Rasmussen |
| 7,200,602 B2 | 4/2007 | Jonas |
| 7,212,995 B2 | 5/2007 | Schulkins |
| 7,249,048 B1 | 7/2007 | O'Flaherty |
| 7,249,076 B1 | 7/2007 | Pendleton et al. |
| 7,272,591 B1 | 9/2007 | Ghazal et al. |
| 7,280,980 B1 | 10/2007 | Hoadley et al. |
| 7,310,617 B1 | 12/2007 | Cunningham |
| 7,315,837 B2 | 1/2008 | Sloan et al. |
| 7,337,133 B1 | 2/2008 | Bezos et al. |
| 7,337,468 B2 | 2/2008 | Metzger |
| 7,356,516 B2 | 4/2008 | Richey et al. |
| 7,370,044 B2 | 5/2008 | Mulhern et al. |
| 7,403,942 B1 | 7/2008 | Bayliss |
| 7,409,369 B1 | 8/2008 | Homuth et al. |
| 7,421,322 B1 | 9/2008 | Silversmith et al. |
| 7,433,864 B2 | 10/2008 | Malik |
| 7,451,113 B1 | 11/2008 | Kasower |
| 7,475,032 B1 | 1/2009 | Patnode et al. |
| 7,505,939 B2 | 3/2009 | Lent et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,542,993 B2 | 6/2009 | Satterfield et al. |
| 7,552,086 B1 | 6/2009 | Rajasekar et al. |
| 7,559,217 B2 * | 7/2009 | Bass ................................ 70/40 |
| 7,593,891 B2 | 9/2009 | Kornegay et al. |
| 7,596,512 B1 | 9/2009 | Raines et al. |
| 7,596,716 B2 | 9/2009 | Frost et al. |
| 7,610,229 B1 | 10/2009 | Kornegay |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,689,505 B2 | 3/2010 | Kasower |
| 7,711,635 B2 | 5/2010 | Steele et al. |
| 7,711,636 B2 | 5/2010 | Robida et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,774,257 B2 | 8/2010 | Maggioncalda et al. |
| 7,788,147 B2 | 8/2010 | Haggerty et al. |
| 7,792,715 B1 | 9/2010 | Kasower |
| 7,797,252 B2 | 9/2010 | Rosskamm et al. |
| 7,814,005 B2 | 10/2010 | Imrey et al. |
| 7,818,228 B1 | 10/2010 | Coulter |
| 7,840,484 B2 | 11/2010 | Haggerty et al. |
| 7,877,304 B1 | 1/2011 | Coulter |
| 7,890,420 B2 | 2/2011 | Haggerty et al. |
| 7,904,306 B2 | 3/2011 | Johnson et al. |
| 7,925,582 B1 | 4/2011 | Kornegay et al. |
| 7,970,676 B2 | 6/2011 | Feinstein |
| 7,970,679 B2 | 6/2011 | Kasower |
| 7,983,932 B2 | 7/2011 | Kane |
| 7,991,901 B2 | 8/2011 | Tarquini et al. |
| 7,996,912 B2 | 8/2011 | Spalink et al. |
| 8,005,759 B2 | 8/2011 | Hirtenstein et al. |
| 8,015,107 B2 | 9/2011 | Kornegay et al. |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,086,523 B1 | 12/2011 | Palmer |
| 8,099,341 B2 | 1/2012 | Varghese |
| 8,127,986 B1 | 3/2012 | Taylor et al. |
| 8,160,960 B1 | 4/2012 | Fei et al. |
| 8,195,549 B2 | 6/2012 | Kasower |
| 8,280,805 B1 | 10/2012 | Abrahams et al. |
| 8,285,656 B1 | 10/2012 | Chang et al. |
| 8,312,033 B1 | 11/2012 | McMillan |
| 8,321,334 B1 | 11/2012 | Kornegay et al. |
| 8,321,952 B2 | 11/2012 | Spalink et al. |
| 8,335,741 B2 | 12/2012 | Kornegay et al. |
| 8,364,588 B2 | 1/2013 | Celka et al. |
| 8,392,334 B2 | 3/2013 | Hirtenstein et al. |
| 8,463,919 B2 | 6/2013 | Tarquini et al. |
| 8,572,083 B1 * | 10/2013 | Snell et al. ..................... 707/736 |
| 8,589,286 B1 | 11/2013 | Kornegay et al. |
| 2001/0011245 A1 | 8/2001 | Duhon |
| 2001/0039523 A1 | 11/2001 | Iwamoto |
| 2001/0049672 A1 | 12/2001 | Moore et al. |
| 2002/0010616 A1 | 1/2002 | Itzhaki |
| 2002/0026507 A1 | 2/2002 | Sears et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0059139 A1 | 5/2002 | Evans |
| 2002/0069122 A1 | 6/2002 | Yun et al. |
| 2002/0077964 A1 | 6/2002 | Brody et al. |

(56) References Cited

U.S. PATENT DOCUMENTS

| | | |
|---|---|---|
| 2002/0099628 A1 | 7/2002 | Takaoka et al. |
| 2002/0099824 A1 | 7/2002 | Bender et al. |
| 2002/0103809 A1 | 8/2002 | Starzl et al. |
| 2002/0111890 A1 | 8/2002 | Sloan et al. |
| 2002/0128962 A1 | 9/2002 | Kasower |
| 2002/0133504 A1 | 9/2002 | Vlahos et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0188544 A1 | 12/2002 | Wizon et al. |
| 2002/0198824 A1 | 12/2002 | Cook |
| 2003/0009418 A1 | 1/2003 | Green et al. |
| 2003/0018549 A1 | 1/2003 | Fei et al. |
| 2003/0018578 A1 | 1/2003 | Schultz |
| 2003/0028466 A1 | 2/2003 | Jenson et al. |
| 2003/0028477 A1 | 2/2003 | Stevenson et al. |
| 2003/0065563 A1 | 4/2003 | Elliott et al. |
| 2003/0069839 A1 | 4/2003 | Whittington et al. |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0149659 A1 | 8/2003 | Danaher et al. |
| 2003/0154162 A1 | 8/2003 | Danaher et al. |
| 2003/0163435 A1 | 8/2003 | Payone |
| 2003/0208412 A1 | 11/2003 | Hillestad et al. |
| 2003/0212654 A1 | 11/2003 | Harper et al. |
| 2003/0229892 A1 | 12/2003 | Sardera |
| 2004/0010458 A1 | 1/2004 | Friedman |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0098625 A1 | 5/2004 | Lagadec et al. |
| 2004/0111292 A1 | 6/2004 | Hutchins |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0128230 A1 | 7/2004 | Oppenheimer et al. |
| 2004/0138995 A1 | 7/2004 | Hershkowitz et al. |
| 2004/0153330 A1 | 8/2004 | Miller et al. |
| 2004/0158521 A1 | 8/2004 | Newton |
| 2004/0186807 A1 | 9/2004 | Nathans et al. |
| 2004/0199456 A1 | 10/2004 | Flint et al. |
| 2004/0199789 A1 | 10/2004 | Shaw et al. |
| 2004/0225594 A1 | 11/2004 | Nolan, III et al. |
| 2004/0230534 A1 | 11/2004 | McGough |
| 2004/0243508 A1 | 12/2004 | Samson et al. |
| 2005/0004855 A1 | 1/2005 | Jenson et al. |
| 2005/0010555 A1 | 1/2005 | Gallivan |
| 2005/0027632 A1 | 2/2005 | Zeitoun et al. |
| 2005/0154664 A1 | 7/2005 | Guy et al. |
| 2005/0192008 A1 | 9/2005 | Desai et al. |
| 2005/0288998 A1 | 12/2005 | Verma et al. |
| 2006/0020611 A1 | 1/2006 | Gilbert et al. |
| 2006/0074991 A1 | 4/2006 | Lussier et al. |
| 2006/0080251 A1 | 4/2006 | Fried et al. |
| 2006/0212386 A1 | 9/2006 | Willey et al. |
| 2006/0218067 A1 | 9/2006 | Steele et al. |
| 2006/0223043 A1 | 10/2006 | Dancy-Edwards et al. |
| 2006/0233332 A1 | 10/2006 | Toms |
| 2006/0242039 A1 | 10/2006 | Haggerty et al. |
| 2006/0242047 A1 | 10/2006 | Haggerty et al. |
| 2006/0242049 A1 | 10/2006 | Haggerty et al. |
| 2006/0271472 A1 | 11/2006 | Cagan |
| 2006/0277092 A1 | 12/2006 | Williams |
| 2006/0282354 A1 | 12/2006 | Varghese |
| 2006/0282359 A1 | 12/2006 | Nobili et al. |
| 2007/0016500 A1 | 1/2007 | Chatterji et al. |
| 2007/0016501 A1 | 1/2007 | Chatterji et al. |
| 2007/0067206 A1 | 3/2007 | Haggerty et al. |
| 2007/0067437 A1 | 3/2007 | Sindambiwe |
| 2007/0078741 A1 | 4/2007 | Haggerty et al. |
| 2007/0100719 A1 | 5/2007 | Chwast et al. |
| 2007/0112668 A1 | 5/2007 | Celano et al. |
| 2007/0118393 A1 | 5/2007 | Rosen et al. |
| 2007/0156554 A1 | 7/2007 | Nikoley et al. |
| 2007/0185797 A1 | 8/2007 | Robinson |
| 2007/0208640 A1* | 9/2007 | Banasiak et al. ............... 705/35 |
| 2007/0214076 A1 | 9/2007 | Robida et al. |
| 2007/0220003 A1 | 9/2007 | Chern et al. |
| 2007/0220611 A1 | 9/2007 | Socolow et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0282730 A1 | 12/2007 | Carpenter et al. |
| 2007/0282736 A1 | 12/2007 | Conlin et al. |
| 2007/0288338 A1 | 12/2007 | Hoadley |
| 2007/0288360 A1 | 12/2007 | Seeklus |
| 2007/0299759 A1 | 12/2007 | Kelly |
| 2007/0299770 A1 | 12/2007 | Delinsky |
| 2007/0299771 A1 | 12/2007 | Brody |
| 2008/0021802 A1 | 1/2008 | Pendleton |
| 2008/0046383 A1 | 2/2008 | Hirtenstein et al. |
| 2008/0059224 A1 | 3/2008 | Schechter |
| 2008/0086400 A1 | 4/2008 | Ardelean et al. |
| 2008/0095441 A1 | 4/2008 | Rosskamm et al. |
| 2008/0109444 A1 | 5/2008 | Williams et al. |
| 2008/0133322 A1 | 6/2008 | Kalia et al. |
| 2008/0140507 A1 | 6/2008 | Hamlisch et al. |
| 2008/0172324 A1 | 7/2008 | Johnson |
| 2008/0177655 A1* | 7/2008 | Zalik ............................. 705/38 |
| 2008/0183504 A1 | 7/2008 | Highley |
| 2008/0222015 A1 | 9/2008 | Megdal et al. |
| 2008/0255980 A1 | 10/2008 | Kasower |
| 2008/0270294 A1 | 10/2008 | Lent et al. |
| 2008/0270295 A1 | 10/2008 | Lent et al. |
| 2008/0301016 A1 | 12/2008 | Durvasula et al. |
| 2009/0048957 A1 | 2/2009 | Celano |
| 2009/0060343 A1 | 3/2009 | Rosca |
| 2009/0063330 A1 | 3/2009 | Cerise |
| 2009/0112650 A1 | 4/2009 | Iwane |
| 2009/0182873 A1 | 7/2009 | Spalink et al. |
| 2009/0198557 A1 | 8/2009 | Wang et al. |
| 2009/0198602 A1 | 8/2009 | Wang et al. |
| 2009/0228918 A1 | 9/2009 | Rolff et al. |
| 2009/0234665 A1 | 9/2009 | Conkel |
| 2009/0240609 A1 | 9/2009 | Cho et al. |
| 2009/0265461 A1 | 10/2009 | Tarquini et al. |
| 2009/0276368 A1 | 11/2009 | Martin et al. |
| 2009/0280467 A1 | 11/2009 | Ahart |
| 2009/0327120 A1 | 12/2009 | Eze et al. |
| 2010/0009320 A1 | 1/2010 | Wilkelis |
| 2010/0009332 A1 | 1/2010 | Yaskin et al. |
| 2010/0023434 A1* | 1/2010 | Bond ............................. 705/35 |
| 2010/0030677 A1 | 2/2010 | Melik-Aslanian et al. |
| 2010/0036697 A1 | 2/2010 | Kelnar |
| 2010/0094758 A1 | 4/2010 | Chamberlain et al. |
| 2010/0094774 A1 | 4/2010 | Jackowitz et al. |
| 2010/0145840 A1 | 6/2010 | Kasower |
| 2010/0169159 A1 | 7/2010 | Rose et al. |
| 2010/0169209 A1 | 7/2010 | Kornegay et al. |
| 2010/0223168 A1 | 9/2010 | Haggerty et al. |
| 2010/0250497 A1 | 9/2010 | Redlich et al. |
| 2010/0299251 A1 | 11/2010 | Thomas |
| 2010/0299252 A1 | 11/2010 | Thomas |
| 2010/0299260 A1 | 11/2010 | Thomas |
| 2010/0299262 A1 | 11/2010 | Handler |
| 2010/0324986 A1 | 12/2010 | Thomas |
| 2010/0325036 A1 | 12/2010 | Thomas |
| 2010/0332381 A1 | 12/2010 | Celka et al. |
| 2011/0004514 A1 | 1/2011 | Thomas |
| 2011/0004546 A1 | 1/2011 | Thomas |
| 2011/0016042 A1 | 1/2011 | Cho et al. |
| 2011/0029427 A1 | 2/2011 | Haggerty et al. |
| 2011/0060672 A1 | 3/2011 | Kasower |
| 2011/0060673 A1 | 3/2011 | Delinsky et al. |
| 2011/0060905 A1 | 3/2011 | Stack et al. |
| 2011/0112950 A1 | 5/2011 | Haggerty et al. |
| 2011/0137760 A1 | 6/2011 | Rudie et al. |
| 2011/0164746 A1 | 7/2011 | Nice et al. |
| 2011/0166988 A1 | 7/2011 | Coulter |
| 2011/0219421 A1 | 9/2011 | Ullman et al. |
| 2011/0255688 A1 | 10/2011 | Spalink et al. |

(56) References Cited

U.S. PATENT DOCUMENTS

| | | | |
|---|---|---|---|
| 2011/0276687 | A1 | 11/2011 | Tarquini et al. |
| 2011/0295733 | A1 | 12/2011 | Megdal et al. |
| 2012/0054592 | A1 | 3/2012 | Jaffe et al. |
| 2012/0066116 | A1 | 3/2012 | Kornegay et al. |
| 2012/0095894 | A1 | 4/2012 | Campbell et al. |
| 2012/0095927 | A1 | 4/2012 | Hirtenstein et al. |
| 2012/0123931 | A1 | 5/2012 | Megdal et al. |
| 2012/0136774 | A1* | 5/2012 | Imrey et al. ............... 705/38 |
| 2012/0265607 | A1 | 10/2012 | Belwadi |
| 2012/0265661 | A1 | 10/2012 | Megdal et al. |
| 2012/0317014 | A1 | 12/2012 | Cerise et al. |
| 2013/0006825 | A1 | 1/2013 | Robida et al. |
| 2013/0173450 | A1 | 7/2013 | Celka et al. |
| 2013/0173451 | A1 | 7/2013 | Kornegay et al. |
| 2013/0173481 | A1 | 7/2013 | Hirtenstein et al. |

FOREIGN PATENT DOCUMENTS

| | | |
|---|---|---|
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-016261 | 1/2003 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| WO | WO 00/11574 | 3/2000 |
| WO | WO 01/57720 | 8/2001 |
| WO | WO 01/84281 | 11/2001 |
| WO | WO 2004/114160 | 12/2004 |
| WO | WO 2005/022348 | 3/2005 |
| WO | WO 2006/099492 | 9/2006 |
| WO | WO 2008/022289 | 2/2008 |
| WO | WO 2008/054403 | 5/2008 |
| WO | WO 2008/147918 | 12/2008 |
| WO | WO 2009/117518 | 9/2009 |
| WO | WO 2010/132492 | 11/2010 |

OTHER PUBLICATIONS

Credit Plus, Inc.; "Score Wizard" [online] [retrieved on Jun. 13, 2007] Retrieved from the internet http://web.archive.org/web/20030806080310/www.creditplus.com/scorewizard.asp Nov. 27, 2002 & Mar. 23, 2003.

CreditXpert, http://www.creditxpert.com/Products/individuals.asp printed Oct. 12, 2012 in 1 page.

CreditXpert Inc., CreditExpert 3-Bureau Comparison™, [online] [retrieved on Jun. 7, 2005] Retrieved from the internet http://www.creditxpert.com/CreditXpert%203-Bureau%20Comparison(TM)%20sample.pdf, 2002.

CreditXpert Inc., CreditXpert Credit Score & Analysis, [online] [retrieved on Jun. 7, 2005] Retrieved from the internet http://www.creditxpert.com/CreditXpert%20Score%20&%20Analysis20and%20Credit%20Wizard%20sample.pdf, 2002.

CreditXpert Inc., CreditXpert Essentials™, Advisor View-Experian Jul. 7, 2003, [online] [retrieved on Nov. 29, 2004] Retrieved from the internet http://www.creditxpert.com/cx_ess_app.pdf, 2004., Issue Wallace.

CreditXpert Inc., CreditXpert Essentials™, Advisor View-TransUnion, [online] [retrieved on Jun. 7, 2005] Retrieved from the internet http://www.creditxpert.com/cx_ess_app.pdf, 2004., Issue Wallace.

CreditXpert Inc., CreditXpert Essentials™, Applicant View, [online] [retrieved on Jun. 7, 2005] Retrieved from the internet http://www.creditxpert.com/cx_ess_app.pdf, 2004.

CreditXpert Inc., CreditXpert What-If Simulator™, [online] [retrieved on Jun. 7, 2005] Retrieved from the internet http://www.creditxpert.com/CreditXpert%20What-If%20Simulator(TM)%20sample.pdf, 2002.

"Debt Settlement: Watch Video on how to Pay Your Debt Faster", http://www.debtconsolidationcare.com/debt-settlement.html printed Jan. 9, 2013 in 6 pages.

Demby, Elayne, "Special Report: Letting Consumers Know the Score—and More", Collections and Credit Risk, New York, Feb. 2003, vol. 8, Issue 2, p. 53, 3 pgs.

Elliehausen et al., The Impact of Credit Counseling on Subsequent Borrower Behavior, The Journal of Consumer Affairs, vol. 41, No. 1, pp. 1-28, Summer 2007.

"Equifax and FICO Serve Consumers", Mar. 2001.

Ettorre, Paul Kahn on Exceptional Marketing. Management Review, vol. 38(11), Nov. 1994, pp. 48-51.

Experian Announces PLUS Score; Experian Press Release dated Oct. 16, 2003; Experian Global Press Office.

Fair Isaac Corporation, myFICO: Calculators: Credit Assessment, [online] [retrieved on Jun. 8, 2005] Retrieved from the internet <URL: http://www.myfico.com/CreditEducation/Calculators/CreditAssessment.aspx>, 2005.

Fair Isaac Corporation, myFICO: Help: FICO Score Simulator, [online] [retrieved on Jun. 8, 2005] Retrieved from the internet http://www.myfico.com/Help/Simulator.aspx?fire=5, 2005.

Fair Isaac Corporation, myFICO: Products: Suze Orman's FICO Kit Platinum, [online] [retrieved on Jun. 8, 2005] Retrieved from the internet http://www.myfico.com/Products/FICOKit/Description.aspx, 2005.

Fair Isaac Corporation, myFICO: Products: Suze Orman's FICO® Kit Platinum: FICO Score Check, [online] [retrieved on Jun. 7, 2005] Retrieved from the internet http://www.myfico.com/Products/FICOKit/Sample03.html, 2005.

Fair Isaac Corporation, myFICO: Sample: FICO Score Simulator: "Max Out" Your Credit Cards, [online] [retrieved on Jun. 8, 2005] Retrieved from the internet http://www.myfico.com/Content/Samples/Sample_ScoreSimulatorResults.asp?Simulation=4&ReportID.

Fair Isaac Corporation, myFICO: Sample: FICO Score Simulator: Miss Payments, [online] [retrieved on Jun. 8, 2005] Retrieved from the internet http://www.myfico.com/Content/Samples/Sample_ScoreSimulatorResults.asp?miss_payment=radiobutton&Simulation=.

Fair Isaac Corporation, myFICO: Sample: FICO Score Simulator: Pay Down Delinquent Balances First, [online] [retrieved on Jun. 8, 2005] Retrieved from the internet http://www.myfico.com/Content/Samples/Sample_ScoreSimulatorResults.asp?textfieldCC=750.

Fair Isaac Corporation, myFICO: Sample: FICO Score Simulator: Suggested Best Action, [online] [retrieved on Jun. 8, 2005] Retrieved from the internet http://www.myfico.com/Content/Samples/Sample_ScoreSimulatorResults.asp?Simulation=111&ReportID=1&Pr.

Hunt, Robert M.; "Whither Consumer Credit Counseling?", Business Review, pp. 9-20 Dec. 31, 2005.

Ideon, Credit-Card Registry that Bellyflopped this Year, Is Drawing some Bottom-Fishers, The Wall Street Journal, Aug. 21, 1995, pp. C2.

"Japan's JAAI system appraises used cars over internet", Asia Pulse, Mar. 3, 2000.

"Judging Credit: Consumers Need Better Finance Tools", News Journal, Daytona Beach, FL, Dec. 28, 2002.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lee, W.A., "Experian Eyes Payments, Mulls Deals" American Banker: The Financial Services Daily, 2pgs., New York, NY, May 30, 2003.

(56) References Cited

OTHER PUBLICATIONS

Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
Loshin, Intelligent Enterprise: Better Insight for Business Decisions, "Value-Added Data: Merge Ahead", Feb. 9, 2000, vol. 3, No. 3, 5 pages.
Miller, Joe, "NADA used-car prices go online", Automotive News, Jun. 14, 1999, p. 36.
Next Card: About Us; as download on Oct. 23, 2009 from http://web.cba.neu.edu/~awatson/NextCardCase/NextCardAboutUs.htm (Copyright 1997-2001); pp. 1-10.
Paustian, Chuck; "Every Cardholder a King Customers get the Full Treatment at Issuers' Web Sites"; Card Marketing; New York; vol. 5, Issue, 3; pp. 1-3; Mar. 2001.
Powerforms: Declarative Client-Side for Field Validation, ISSN 1386-145x, Dec. 2000.
"PremierGuide Announces Release 3.0 of Local Search Platform", Business Wire, p. 5574, Palo Alto, CA, Mar. 4, 2004.
"Qualifying for Debt Settlement", http://www.certifieddebt.com/debt/settlement-qualifications.shtml printed Jan. 9, 2013 in 2 pages.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf as printed on Aug. 13, 2007.
"Resolve Debt for Less: With Help from Freedom Financial" http://www.debtsettlementusa.com/ printed Jan. 9, 2013 in 6 pages.
Sawyers, Arlene, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
"Settling Your Debts—Part 1 in Our Debt Settlement Series", http://www.creditinfocenter.com/debt/settle_debts.shtml printed Jan. 9, 2013 in 6 pages.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Stein, Benchmarking Default Prediction Models: Pitfalls and Remedies in Model Validation, Moody's KMV, Revised Jun. 13, 2002, Technical Report #020305; New York.
Tao, Lixin, "Shifting Paradigms with the Application Service Provider Model"; Concordia University, Canada; IEEE; Oct. 2001.
"WashingtonPost.com and Cars.com launch comprehensive automotive web site for the Washington area", PR Newswire, Oct. 22, 1998.
Watts, Craig, "Consumers Now Can Know What Loan Rate Offers to Expect Based on Their FICO Credit Score at MyFICO.com", Mar. 6, 2002, httb://www.myfico.com/PressRoom/PressReleases/2002_03_06.aspx.
Watts, Craig, "Fair, Isaac and Equifax Give Consumers New Score Power Tools Offering Greater Insights for Managing Their Credit Health", May 21, 2002, httb://www.myfico.com/PressRoom/PressReleases/2002_05_21.aspx.

Webpage printed from http://www.magnum.net/pdfs/RapUpBrochure.pdf on Mar. 4, 2008.
Yücesan et al., "Distributed web-based simulation experiments for optimization", Simulation Practice and Theory 9 (2001), pp. 73-90.
Zimmerman et al., "A web-based platform for experimental investigation of electric power auctions", Decision Support Systems 24 (1999), pp. 193-205.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
International Preliminary Report on Patentability and Written Opinion for Application No. PCT/US2005/041814, dated Aug. 29, 2007.
Avery et al., "Consumer Credit Scoring: Do Situational Circumstances Matter?", Journal of Banking & Finance, vol. 28, 2004, pp. 835-856.
CreditAnalyst, Digital Matrix Systems, as printed out Mar. 4, 2008, pp. 2.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
CreditToolkit, Digital Matrix Systems, as printed out Mar. 4, 2008, pp. 2.
"Credit Improvement", CreditRepair.com, Mar. 10, 2010, http://web.archiye.org/web/20100310134914/http://www.creditrepair.com/credit/ printed Mar. 22, 2013 in 2 pages.
Fisher, Joseph, "Access to Fair Credit Reports: Current Practices and Proposed Legislation," American Business Law Journal, Fall 1981, vol. 19, No. 3, p. 319.
"Managing Debt?" Federal Trade Commission: Consumer Information, http://www.consumer.ftc.gov/articles/0158-managing-debt printed Mar. 22, 2013 in 4 pages.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Mint.com, http://www.mint.com/how-it-works/ printed Feb. 5, 2013 in 2 pages.
Occasional CF Newsletter; http://www.halhelms.com/index.cfm?fuseaction=newsletters.oct1999, Oct. 1999.
Partnoy, Frank, Rethinking Regulation of Credit Rating Agencies: An Institutional Investor Perspective, Council of Institutional Investors, Apr. 2009, pp. 21.
Planwise, http://planwise.com printed Feb. 8, 2013 in 5 pages.
Romig, Shane, "The Truth About Credit Repair", Credit.conn, May 5, 2010, http://web.archive.org/web/20100505055526/http://www.credit.com/credit_information/credit_help/The-Truth-About-Credit-Repair.jsp printed Mar. 22, 2013 in 4 pages.
West, David, "Neural Network Credit Scoring Models", Computers & Operations Research, vol. 27, 2000, pp. 1131-1152.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US10/34434, dated Jun. 23, 2010.

\* cited by examiner

Debt Settlement Status Calculator

| | |
|---|---|
| Name: | John Doe |
| Social Security Number: | ###-##-#### |
| Address: | Street |
| | City |
| | State |
| | Zip Code |

[X] I authorize Debt Services Locator to access my credit data for purposes of determining available debt management options.

( Generate Debt Settlement Status ) — 500

DEBT SERVICES CANDIDATE LOCATOR

CROSS-REFERENCE TO RELATED APPLICATIONS

This application claims the benefit of U.S. Provisional Application No. 61/546,898, filed on Oct. 13, 2011, the entirety of which is hereby incorporated herein by reference.

BACKGROUND

Debt settlement, also known as debt arbitration, debt negotiation or credit settlement, is an approach to debt reduction in which the debtor and creditor agree on a reduced balance that will be regarded as payment in full. Agreement is typically reached in view of actions by a debt settlement service provider on behalf of a consumer. Consumers that are interested in debt settlement may contact such a debt settlement service provider, provide personal and financial information to the company, and request that the debt settlement service provider contact the consumer's creditors and work out a debt settlement. However, there are many consumers that may be eligible for some form of debt settlement, but are unaware that they qualify for the debt settlement. Accordingly, such consumers may never contact a debt settlement service and request debt settlement services.

SUMMARY

Many consumers that may be eligible for debt settlement services are unaware that they qualify for debt settlement or other debt services. Consequently, these consumers may never contact a debt settlement service or request debt settlement services. Thus, it would be advantageous for these consumers and their creditors to be able to quickly identify whether this type of consumer is eligible for debt settlement.

Described herein, among other things, are systems and methods for enabling a requesting entity to identify and locate candidates for debt settlement services, such as debt help, debt settlement, and/or bankruptcy. Once identified, the consumers may be contacted (via any medium, such as voice call, text message, email, direct mail, etc.) with indications of possible eligibility for one or more debt services, specific information of the consumer that was accessed to determine that the consumer is a good candidate for the indicated debt services, details on the indicated debt services, predicted outcomes, and/or any other information regarding financial data of the consumers or the indicated debt services. Alternatively, consumers operating user devices may request information regarding eligibility for debt services from the debt settlement candidate locator.

In one embodiment, a method of identifying and locating debt settlement candidates comprises receiving a request for a debt score for a consumer, accessing credit data of the consumer, calculating a debt score based on at least the accessed credit data of the consumer, wherein the debt score is usable to determine a likelihood of the consumer being eligible for debt settlement, and providing a requesting entity with the debt score and/or the determined likelihood of the consumer being eligible for debt settlement.

In one embodiment, the debt score is usable to determine a likelihood of the consumer being eligible for debt help. The debt score may be usable to determine a likelihood of the consumer being qualified for bankruptcy approval. The debt score may be calculated based on one or more attributes of the credit data that have been pre-selected by the requesting entity. The debt score may be calculated based on two or more of: a credit score rank, a credit score, a ratio of revolving credit to debt, an amount of credit available, a quantity of delinquent accounts, a quantity of negative accounts, an average age of tradelines in the credit data, or a quantity of negative information in the credit data. The debt score may be further calculated based on one or more of: public record, debit, demographic, or psychographic information associated with the consumer. The credit score rank may be a percentage based on a comparison of the consumer's credit score with an average of a plurality of consumer credit scores.

In one embodiment, a method comprises calculating, by a computing system having one or more computer processors, a debt score of a consumer based on one or more credit data attributes of the consumer obtained from a credit report of the consumer, providing a user interface depicting the calculated debt score and any debt services likely available to the consumer based on the calculated debt score, wherein the user interface includes controls configured for adjustment by the consumer in order to perform hypothetical adjustments to one or more credit attributes of the consumer in order to initiate calculation of a hypothetical debt score based on the hypothetical adjustments, and updating the user interface to include debt services that are likely available to the consumer based on the hypothetical debt score.

In one embodiment, the method further comprising receiving a desired debt score via the user interface, and providing hypothetical changes to credit attributes of the consumer that result in the hypothetical debt score reaching the desired debt score. The user interface may depict at least some of the credit data attributes. The hypothetical credit score rank, credit score, revolving credit to debt ratio, credit available, delinquent accounts, negative accounts, instances of negative information on their credit report, public record data, average account age, debit, or a combination thereof may be calculated in response to receiving the desired debt score. The debt services may include one or more of bankruptcy, debt settlement, debt counseling, credit monitoring, or debt monitoring. The user interface may further depicts a debt scale displaying ranges of debt scores associated with corresponding debt services

BRIEF DESCRIPTION OF THE DRAWINGS

FIG. 7 is an illustrative webpage user interface generated at least in part by a debt settlement candidate locator system that includes interface controls configured to receive information about a consumer in order to authorize the locator system to access credit data of the consumer.

DETAILED DESCRIPTION

Figure 1:
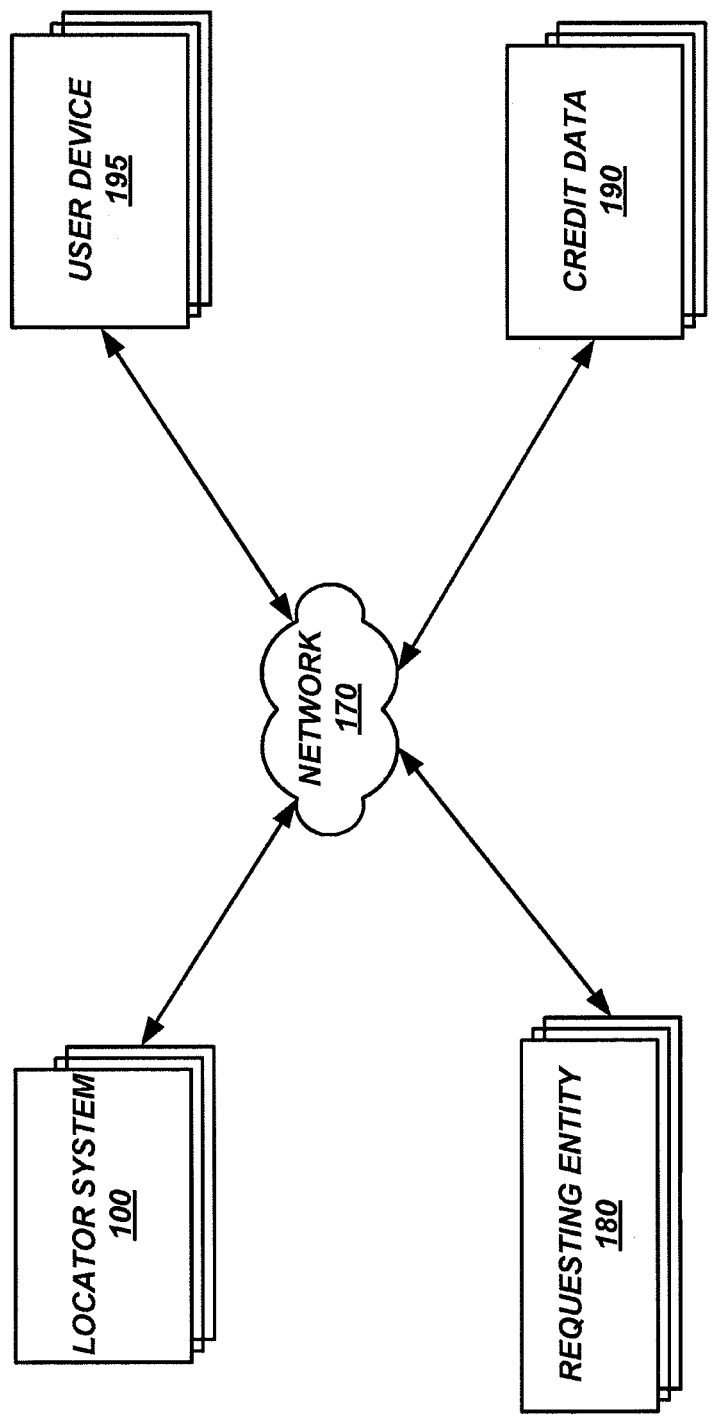
FIG. 1 is a block diagram depicting one embodiment of a locator device in communication with a user device, credit data, and requesting entity.

Although several embodiments, examples and illustrations are disclosed below, it will be understood by those of ordinary skill in the art that the subject matter described herein extends beyond the specifically disclosed embodiments, examples and illustrations and includes additional uses, obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments. In addition, some embodiments include several novel features and no single feature is solely responsible for contributing to the desirable attributes of the embodiments or is essential.

In the following detailed description, references are made to the accompanying drawings that illustrate example embodiments in which the subject matter of this disclosure may be practiced. Electrical, mechanical, programmatic and structural changes may be made to the embodiments without departing from the spirit and scope of the disclosure. Unless indicated otherwise, terms as used herein will be understood to imply their customary and ordinary meaning.

The embodiments disclosed herein describe systems and methods for identifying and locating potential candidates for debt services, such as debt help, debt settlement, and/or bankruptcy. A requesting entity, such as a credit bureau, creditor, debt settlement agency, or individual, may request generation of a debt score for a consumer by a debt settlement locator system (also referred to as "locator system") based on credit data of the consumer and/or other personal or financial information of the consumer. The credit data of the consumer is accessed and analyzed in order to identify the client's eligibility for one or more debt services, such as debt help, debt settlement, bankruptcy, and/or other debt services or financial management services. In some embodiments, the debt score may be placed on a debt scale which informs the requesting entity of one or more available debt services that the consumer may qualify for.

In one embodiment, a requesting entity, such as a debt settlement company, requests debt settlement scores and/or debt settlement services associated with the scores, for a plurality of consumers and then, based on the debt scores, contacts the consumers (via any medium, such as voice call, text message, email, direct mail, etc.) that are likely eligible for one or more debt services offered by the debt settlement company. In one embodiment, the notification to consumers may indicate that the consumer may be eligible for one or more particular debt services, e.g., debt settlement, specific information of the consumer that was accessed to determine that the consumer is a good candidate for the indicated debt services, details on the indicated debt services, predicted outcomes, and/or any other information regarding the indicated debt services.

Example System Implementation

FIG. 1 is a block diagram showing an example configuration of a debt settlement candidate locator system 100 (or "locator system 100") in communication with a requesting entity 180, credit data 190 and user device 195. In this embodiment, a requesting entity 180 communicates with the locator system 100 to identify and locate consumers that qualify for one or more debt services, such as debt settlement.

In this embodiment, the requesting entity 180 represents any entity that offers or works in connection with debt services, such as an entity that is a partner with the provider of the locator system 100. In other embodiments, the owner of the locator system 100 also offers debt services, such that the requesting entity 180 and locator system 100 are commonly owned. Additionally, in some embodiments the requesting entity 180 may be the consumer for which an indication of potentially available debt services is desired.

In one embodiment, the requesting entity, e.g., a debt settlement company, requests debt settlement eligibility information from the locator system 100 for a plurality of consumers, such as consumers on a lead list obtained by the debt settlement company. The requesting entity 180 may then contact consumers of interest, e.g., those that likely qualify for a debt settlement service offered by the debt settlement company, such as by transmitting an electronic communication to the user devices 195 of the consumers of interest. Alternatively, consumers operating user devices 195 may request information regarding eligibility for debt services directly from the locator system 100. Consumers that likely qualify for one or more debt services (e.g., based on credit data 190 obtained by the locator system 100 regarding the respective consumers) may contact one or more debt service providers, e.g., debt settlement companies, via information also provided by the locator system 100 or information independently obtained by the consumer.

In one embodiment, the locator system 100 gathers credit data from the credit data 190, which may be a credit bureau and/or agent of one or more credit bureaus, and communicates the results to a user device 195. Depending on the embodiment, the user device 195 may include any type of device, such as mobile telephones, tablets, desktop computers, etc. The user device 195 may include one or more devices that are solely used by the user and/or one or more devices that are used by the user, as well as other users (such as a public library computer that may be used by a user as well as many other library patrons). Depending on the embodiment, other systems for locating debt settlement candidates may include additional or fewer components than are illustrated in the example of FIG. 1.

Figure 2:
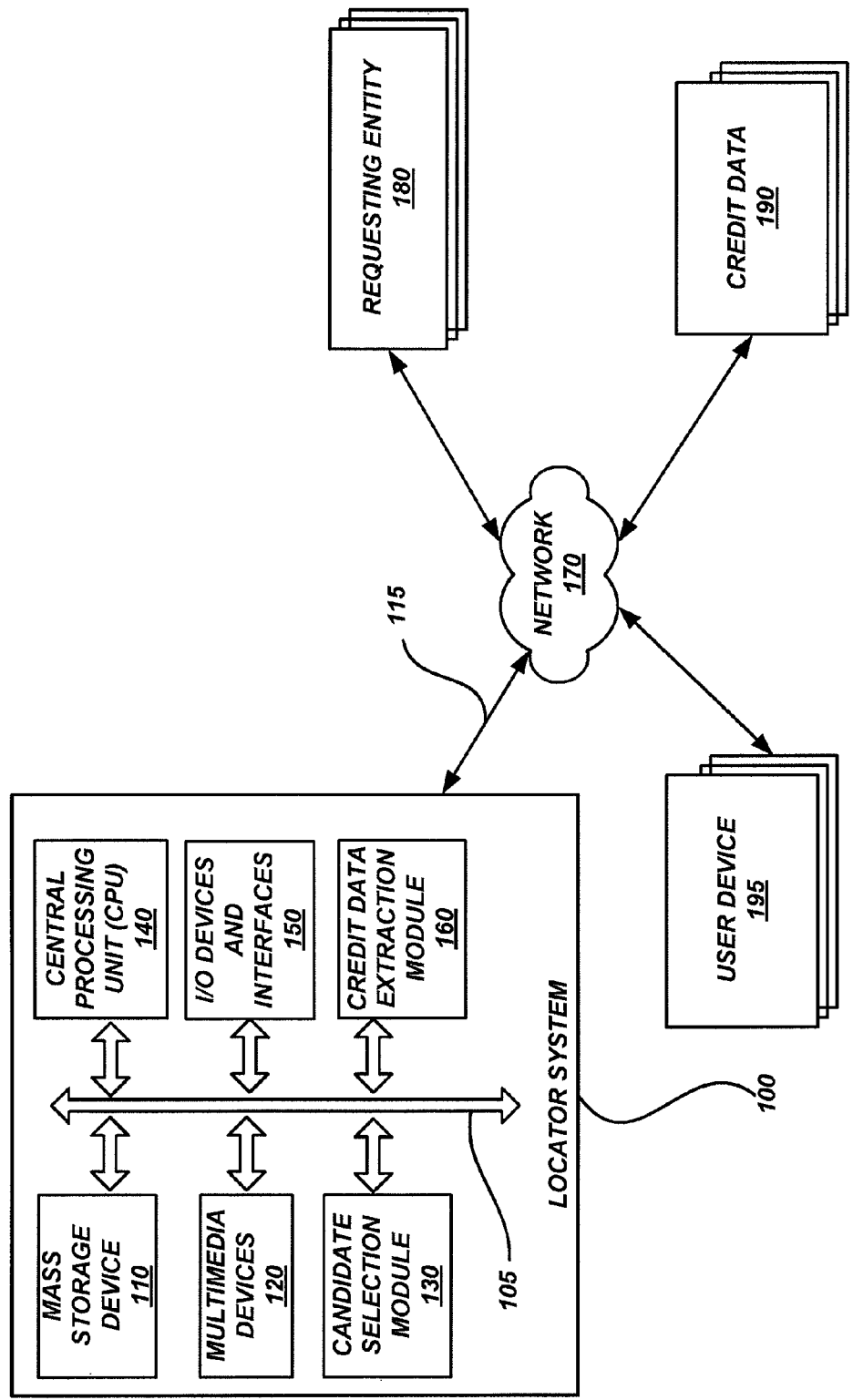
FIG. 2 is a block diagram depicting one embodiment of the debt settlement candidate locator system in communication with a network and various systems which are also in communication with the network.

FIG. 2 is a block diagram depicting one embodiment of the locator system 100 in communication with a network 170 and various systems also in communication with the network 170. The locator system 100 may be used to implement systems and methods herein. For example, the locator system 100 may receive credit data 190 of a consumer, extract data from the credit data 190, and provide a determination of the consumer's qualification (or likely qualification) for one or more debt services.

In the embodiment of FIG. 2, the locator system 100 is configured to access credit data of consumers, process the credit data to identify consumers matching predefined criteria indicative of respective consumers' eligibility for one or more debt services, and provide contact or identifying information of located consumers to a requesting entity 190, such as a debt settlement company.

In one embodiment, the credit data 190 is maintained by a credit bureau. In one embodiment, the locator system 100 is also maintained by a credit bureau, such that the link between the locator system 100 and the credit data 190 is via a secured local area network, for example. In other embodiments, a portion of the credit data from the credit data 190 is stored local to the locator system 100. Other manners of accessing credit data by the locator system 100 are also contemplated.

In the embodiment of FIG. 2, the locator system 100 includes a credit data extraction module 160 and a candidate selection module 130 that are configured for execution on the locator system 100 in order to analyze credit data and identify candidates for debt settlement, respectively. In particular, the credit data extraction module 160 is configured to access credit data of consumers, such as by retrieving credit data from a credit bureau data store or other source. In one embodiment, the credit data extraction module parses and/or extracts portions of consumer credit files or reports and provides the data to the candidate selection module 130, such as by storing on a local storage device, e.g., the mass storage device 110. In this embodiment, the candidate selection module 130 is configured to analyze the credit data provided by the credit data extraction module 160 in order to identify candidates for debt settlement. As noted above, any attributes of the consumers' credit data, and various predefined threshold levels for the respective attributes, may be considered in identifying candidates for debt services.

In one embodiment, the locator system 100 provides debt settlement candidates to multiple debt services providers, and each debt services provider may define custom rules for identifying candidates for one or more debt services provided by the respective debt services provider. For example, a debt settlement company may select credit data attributes and/or threshold levels that must be matched to qualify a consumer as a candidate for debt settlement by that particular debt settlement provider, which are different than credit attributes and/or threshold levels of other debt settlement companies. Depending on the embodiment, the candidate selection module 130 provides various information to the requesting entity 180, such as basic consumer demographic information (e.g., name, address, telephone, e-mail, etc.), or possibly more detailed information regarding the consumers credit data, such as the specific values of the credit data attributes that cause the consumer to be a candidate for debt settlement.

In one embodiment, the locator system 100 provides the requesting entity 180 with a generated debt score based on the consumer's credit data. The requesting entity may then determine the candidate's qualification for debt settlement or other debt services based on the debt score. In other embodiments, the locator system 100 provides the requesting entity 180 with a likelihood of eligibility of the candidate for each of one or more debt services. For example, the locator system 100 may transmit eligibility likelihoods (e.g., percentages or some other indicators) for each of debt help, debt settlement, and bankruptcy to the requesting entity rather than, or in addition to, a calculated debt score (such as based on an algorithm using attributes and/or thresholds defined by the requesting entity).

The requesting entity 180, upon receipt of debt scores, debt services that consumers are likely eligible for, and/or leads for debt settlement candidates identified by the locator system 100, may contact the consumers and offer debt settlement services, along with other information that may be useful in educating the consumer on the likelihood that debt settlement is a real possibility.

In one embodiment, if a consumer does not qualify or meet the requirements for debt settlement (e.g., based on system attributes/thresholds or customer-specific attributes/thresholds), the locator system 100 may present other relevant offers, utilities, tools, and/or products for financial management that the consumer can use. Thus, even for those consumers that don't qualify for debt settlement, the system may provide useful products for managing the consumer's finances, for example.

In one embodiment, credit report data of consumers that are identified as debt settlement candidates is provided to the debt settlement service for prepopulation of the consumers account/profile and/or for use in creating an offer to one or more creditors for settlement. For example, consumer demographic information, contact information, account information, summarized credit statistics, etc. may be provided to the debt settlement service. Thus, the credit data that is available to the locator system 100 may be useful to reduce the work of the debt settlement provider in establishing consumer accounts and putting together account information for purposes of debt settlement negotiations.

In one embodiment, the debt settlement service (e.g., either operated by the same entity as the candidate locator system 100, or a separate entity) negotiates with the creditors to have the debt settlement report to credit bureaus as "paid as agreed," by virtue of the new agreements between the consumer and lenders/creditors. Such debt settlement may have a reduced (or no) impact on the consumers' credit report/score, as compared to the typical "account settled" status that is reported to credit bureaus when accounts are settled via debt settlement series, which may have a negative impact on the consumers' credit report/score. In one embodiment, creditors are more willing to report the settlement as "paid as agreed" in view of the prescreening of the consumers for settlement eligibility (e.g., as discussed above) and/or the streamlining of information exchange that is possible through use of consumer information extracted from credit reports of the consumers.

Example Computing System

The locator system 100 includes, for example, a personal computer that is IBM, Macintosh, or Linux/Unix compatible or a server or workstation. In one embodiment, the locator system 100 comprises a server, a laptop computer, a cell phone, a personal digital assistant, a kiosk, or an audio player, for example. In one embodiment, the exemplary locator system 100 includes one or more central processing unit ("CPU") 140, which may each include a conventional or proprietary microprocessor.

The locator system 100 further includes one or more mass storage devices 110, such as a hard drive, diskette, solid state drive, or optical media storage device. Typically, the modules of the locator system 100 are connected to the computer using a standard based bus system 105. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the locator system 100 may be combined into fewer components and modules or further separated into additional components and modules.

The locator system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the locator system 100 may be controlled by a proprietary operating system. Conventional operating systems control and schedule computer processes for execution, perform memory management, provide file system, networking, I/O services, and provide a user interface, such as a graphical user interface ("GUI"), among other things.

The locator system 100 may include one or more commonly available input/output (I/O) devices and interfaces 150, such as a keyboard, mouse, touchpad, and printer. In one embodiment, the I/O devices and interfaces 150 include one or more display devices, such as a monitor, that allows the visual presentation of data to a user. More particularly, a display device provides for the presentation of GUIs, application software data, and multimedia presentations, for example. The locator system 100 may also include one or more multimedia devices 120, such as speakers, video cards, graphics accelerators, and microphones, for example.

In the embodiment of FIG. 2, the I/O devices and interfaces 150 provide a communication interface to various external devices. In the embodiment of FIG. 2, the locator system 100 is electronically coupled to a network 170, which comprises one or more of a LAN, WAN, and/or the Internet, for example, via a wired, wireless, or combination of wired and wireless, communication link 115. The network 170 communicates with various computing devices and/or other electronic devices via wired or wireless communication links.

According to FIG. 2, information is provided to the locator system 100 over the network 170 from one or more data sources. The data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 2, the locator system 100 also includes modules 130, 160 that may be stored in the mass storage device 110 as executable software codes that are executed by the CPU 140. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the locator system 100 is configured to execute the modules 130, 160 in order to identify candidates for debt settlement, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 3:
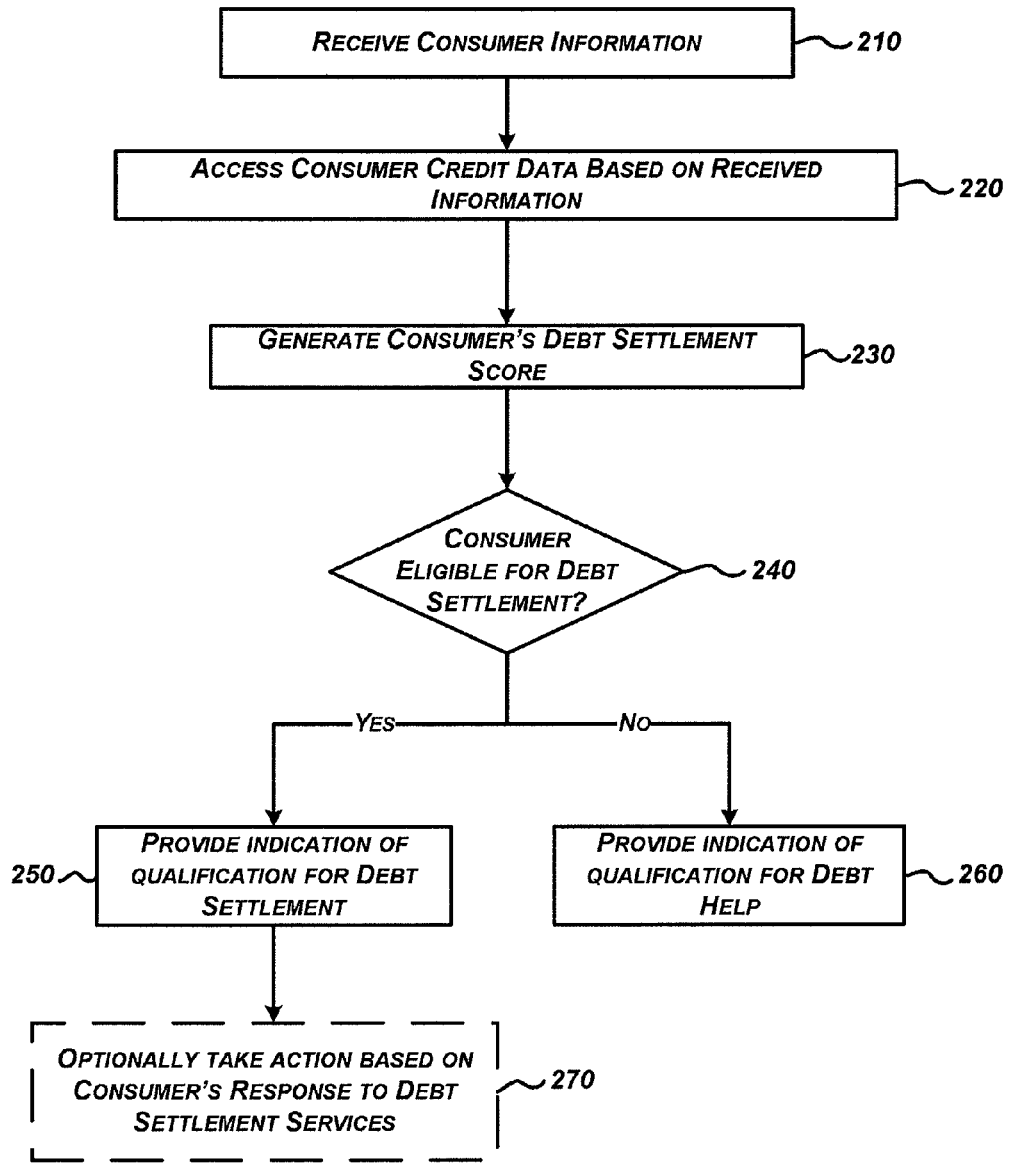
FIG. 3 is a flowchart illustrating one embodiment of a method for identifying and locating a debt settlement candidate.

FIG. 3 is a flowchart illustrating one embodiment of a method of identifying and locating debt settlement candidates. The method may be performed, for example, by a locator system 100 of FIG. 1, or by other suitable computing systems. In an embodiment, the method shown in FIG. 3 may be performed substantially in real time so that the requesting entity (or consumer) is presented with debt services qualification information without substantial delay. FIG. 3 illustrates an embodiment where a requesting entity is attempting to locate candidates for one or more debt settlement services. However, a similar method may be performed in response to a consumer's request for debt settlement services qualification information. In various embodiments, fewer blocks or additional blocks may be included in the process, or various blocks may be performed in an order different from that shown in FIG. 3.

At block 210, the locator system 100 receives information regarding one or more consumers from a requesting entity 180, such as a debt services provider. Such information may include personal identifying information enabling the locator system 100 to determine the identity of the consumers. The information may include an authorization for the locator system 100 to access credit data of the consumers. In some embodiments, the information can be received through one or more user interfaces provided to the consumer and/or third party. Alternatively, the information may be received in other manners, such as via a batch process wherein a data structure including information regarding a plurality of consumers is transmitted by the requesting entity to the locator system 100, such as daily, weekly, or monthly. The information may be included in any available file format, such as a database, spreadsheet, or markup language format.

At block 220, the locator system 100 accesses credit data 190 of the one or more consumers. The credit data may be retrieved from one or more credit bureaus, may be stored locally on the locator system 100, may be entered by the consumer or other requesting entity, or may be maintained and/or retrieved from other sources.

The locator system 100 is configured to process the credit data to identify consumers matching predefined criteria indicative of a respective consumers' eligibility for one or more debt services, and provide the located consumers to the requesting entity. For example, consumer credit scores may be used to identify candidates for debt settlement services. In some embodiments, other data, such as credit score rank, credit available, number of delinquent accounts, and other information in consumers' credit files may be analyzed to identify candidacy for debt services. Depending on the embodiment, debt services providers may have custom rules for identifying candidates for one or more debt services provided by the respective debt services provider. The custom rules may change the debt scores and/or likely available debt services for different debt services providers.

At block 230, the locator system 100 generates a debt score based on credit data of the consumer. For example, credit score, credit available, number of delinquent accounts, and other information in consumers' credit files may be analyzed to generate a consumer's debt score. In some embodiments, credit data may also include data that is derived from credit data of consumers, such as a credit score rank that is indicative of a particular consumers credit score relative to a group of consumers. Credit score rank may rank a consumer's credit score in view of other consumers for which a particular requesting entity has previously provided a particular debt service. For example, the locator system may be provided with information from a particular debt settlement company regarding credit scores of consumers that have been successfully provided debt settlement (or other debt services) from the debt settlement company. Thus, the locator system may rank a particular consumer's credit score relative to the actual credit scores of consumers that have actually received the corresponding debt service from the debt settlement provider. In some embodiments, consumers are ranked with reference to a larger group of consumers credit scores. For example, a credit score rank may be with reference to all credit scores, or all credit scores of consumers having a particular demographic (or other) characteristic, such as consumers within a particular state, region, age range, etc. In some embodiments, more than one credit score ranking may be used in a debt score algorithm. For example, one or more of the following attributes may be used to identify consumers eligible for debt settlement services based on credit data:

| Credit attribute | Threshold |
| --- | --- |
| Credit Score rank: | e.g., under 40%, 60%, or 80% |
| Credit score: | e.g., under 500, 600, or 700 |
| Revolving credit to debt ratio: | e.g., below 48%, 60%, or 72% |
| Credit available: | e.g., below $5,000, $7,500, or $10,000. |
| Delinquent accounts | e.g., more than 0, 1, 2 |
| Negative information on their credit report | e.g., yes or specific types of negative info. |
| Public record data | e.g., yes or specific types of public record data |
| Average account age | e.g., less than 3, 5, or 7 year |

The attributes above may be individually compared to a consumer's credit data in order to determine if the consumer is eligible for debt settlement (or other debt service), or may be combined into an algorithm or model that generates a debt score usable to make a similar determination (e.g., whether that consumer is eligible for debt settlement or other debt services). For example, one implementation may generate a debt score of 55 for consumers with a credit score rank of less than 60%, with a credit score of less than 600, and at least one delinquent account. This consumer may be identified as being eligible for debt settlement. Another implementation may generate a debt score of 30 for candidates with credit scores of less than 500, with a revolving credit to debt ratio of less than 48%, and an average account age of less than 3 years. This consumer may be identified as being eligible for bankruptcy. In other embodiments, any other credit attribute or threshold may be used. Additionally, other attributes, such as demographic, debit (e.g., checking account information), psychographic (e.g., propensities, interests, etc.), or other information may be used to calculate a debt score. Any combination of the above attributes and thresholds may also be used to generate a debt score. In some embodiments, the above attributes and thresholds may be used to identify candidates for debt settlement without generating a debt score.

Depending on the debt services provider, there may be custom rules for identifying and generating a debt score. These custom rules may affect the quantity and specific consumers that are determined to likely be eligible for debt services for respective debt services providers.

At block 240, the locator system 100 determines whether, based on the respective consumer's credit data and/or debt score, the consumer is eligible for debt settlement services. If the consumer is eligible, then at block 250 the locator system 100 provides the requesting entity with an indication that the particular consumer is likely eligible for debt settlement at block 250. Such indications may be provided in a batch format, such as in response to processing the list of the plurality of consumers through the locator system.

In the embodiment of FIG. 2, if the consumer is not eligible for debt settlement at block 240, the locator system 100 provides an indication that the consumer may be eligible for debt help at block 260. In other embodiments, other debt services may be considered with reference to debt scores of consumers. Thus, rather than the two outcomes illustrated in FIG. 2, multiple outcomes may be possible in other embodiments, such that each analyzed consumer may qualify for one or more of the plurality of debt services.

Depending on the embodiment, the locator system 100 may additionally provide debt settlement options to the requesting entity 180. For example, if the requesting entity 180 is a broker of debt services (e.g. an intermediary between consumers and multiple debt services providers), the locator system 100 may be configured to provide the requesting entity 180 with best options for debt services providers to handle each of the qualifying consumers specific debt services needs. Thus, in one embodiment the locator system 100 may match a particular consumer debt score to different options from different debt services providers and provide such indications to the requesting entity 180. Accordingly, a particular consumer may qualify for debt settlement through a first debt services provider, while only qualifying for debt help through a second debt services provider.

In other embodiments, the locator system 100 provides the requesting entity 180 with a likelihood of eligibility on the candidate for each of one or more debt services. For example, the locator system 100 may transmit eligibility likelihoods (e.g., percentages or some other indicators) for each of debt help, debt settlement, and bankruptcy to the requesting entity rather than, or in addition to, a calculated debt score (such as based on an algorithm using attributes and/or thresholds defined by the requesting entity). The eligibility likelihoods can be utilized by debt services providers to determine which consumers to contact for debt settlement services or other educational resources for financial management.

In one embodiment, at block 270 the requesting entity 180 may choose to take action based on the available debt settlement services. For example, if the requesting entity 180 is a debt settlement company, it may choose to receive more information about the eligible consumer. In another example, if the requesting entity is a consumer, the consumer may choose to select one of the provided debt settlement options and engage in debt settlement.

Figure 4:
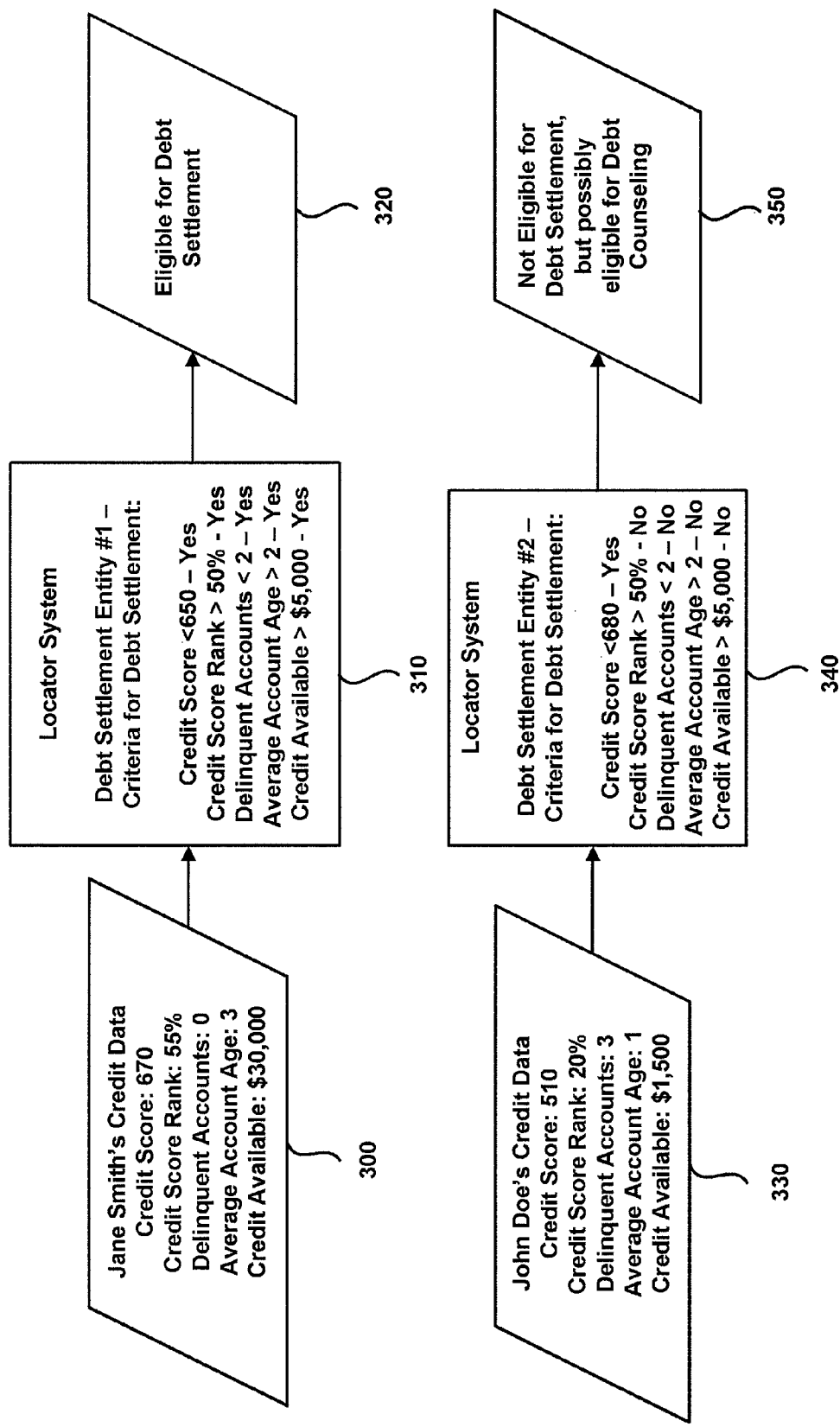
FIG. 4 is a diagram illustrating exemplary credit data of two individuals that may be accessed in in order to determine debt service options that may be available to the individuals.

FIG. 4 is a diagram illustrating an application of the debt settlement candidate locator to two candidates (e.g., Jane Smith and John Doe). In the example of FIG. 4, the Jane Smith's credit data 300 is accessed and analyzed by the locator system 310 in determining whether Jane Smith is eligible for one or more debt services. In this example, the determination of debt settlement eligibility is based on Jane Smith's credit score, credit score rank, number of delinquent accounts, average account age, and credit available. The locator system 310 may generate a debt score based on these credit attributes. That debt score may then be compared to debt settlement criteria for debt settlement entity #1 in order to determine that Jane Smith is eligible for debt settlement from that particular debt settlement.

In the example of FIG. 4, the John Doe's credit data 330 is accessed and analyzed by the locator system 340 in determining whether John Doe is eligible for one or more debt services. In this example, the determination of debt settlement eligibility is based on John Doe's credit score, credit score rank, number of delinquent accounts, average account age, and credit available. John's eligibility for debt services may be based on a debt score that is calculated based on these (or other) credit attributes, or maybe based on a comparison of specific credit attributes to qualification criteria is for the debt settlement entity #2. In this example, the assessment of John Doe's credit data 350 results in a determination of non-eligibility for debt settlement, but possible eligibility for debt counseling 350. Depending on the embodiment, debt services providers may have custom credit data variables for identifying candidates for one or more debt services provided by the respective debt services provider. In some embodiments, the debt services options will vary depending on the consumer's credit data and/or debt score.

In some embodiments, the locator system 100 is configured to provide indications of consumers that are likely to be eligible for a particular debt service in the future, such as based on changes to the consumers credit attributes and/or debt score over a previous time period. For example, if debt scores range from 0-100, with 30 being the cut off for debt settlement eligibility (e.g., 30 and below qualifies for debt settlement help) for a particular debt settlement provider, an indication of possible future qualification for debt settlement may be provided for a consumer that had a debt score of 45 three months prior, 40 two months prior, and 35 in the prior month. Thus, the locator system may be usable to predict debt eligibility of consumers for debt services, which may allow the debt services provider and/or locator system to prepare consumers for quick qualification and resolution of debt issues through the debt services when available.

Sample User Interfaces

Figure 5B:
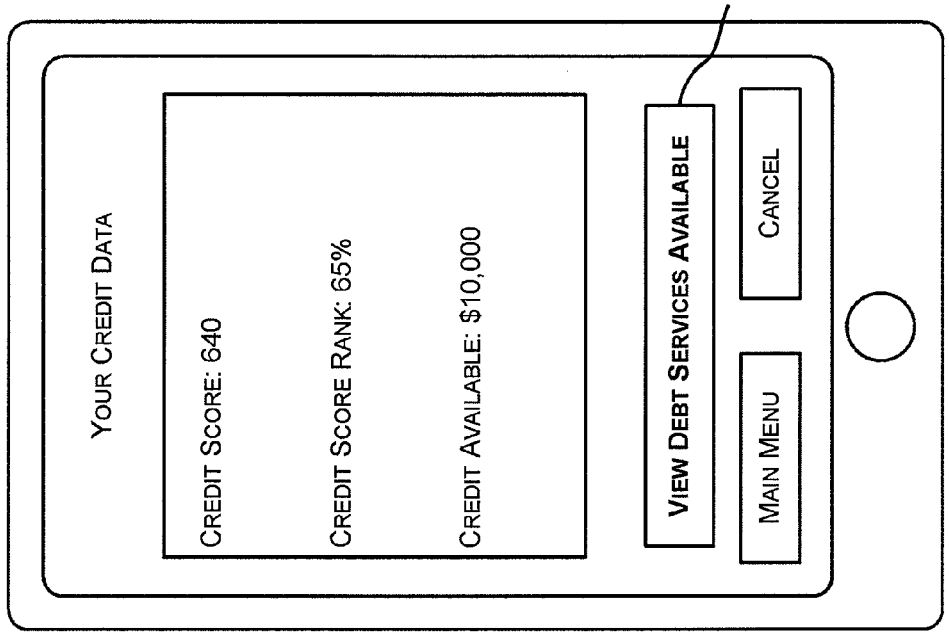
FIGS. 5A-B are illustrative user interfaces generated at least in part by a debt settlement candidate locator system that includes receiving information and displaying credit data.
Figure 5A:
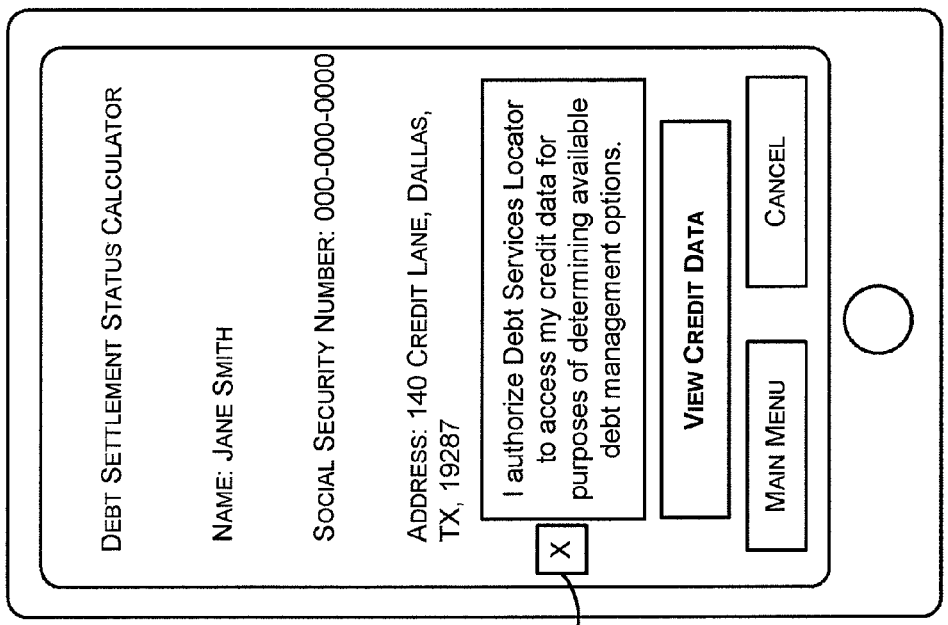

Various user interfaces and methods of displaying the debt settlement candidate locator, as well as components of the debt settlement candidate locator, may be used. For example, FIG. 5A illustrates an example user interface that allows a consumer to input identifying information and authorize access to the consumer's credit data. The user can then choose to view the accessed credit data. In the example of FIG. 5A, Jane Smith's name, social security number, and address are requested for identification purposes. Depending on the embodiment, different user inputs may be requested. Once the authorization box 400 is checked, the user can choose to view the credit data accessed and analyzed by the locator system 100. The example of FIG. 5B illustrates the display of Jane Smith's credit data. In this example, the debt services provider that provides the user interface (or is otherwise affiliated with the provider of the debt settlement status calculator) selected the customized credit data of credit score, credit score rank, and credit available to determine eligibility of the consumer. Depending on the embodiment, the displayed variables will be different customized credit data variables for identifying candidates for one or more debt services provided by the respective debt services provider. Additionally, the credit data actually used to determine a debt score and/or eligibility for debt services may not be displayed to the consumer, such as in FIG. 5B, or partially displayed to the consumer (e.g., more than the credit score, credit score rank, and credit available may be used to calculate the debt score for the consumer Jane Smith, without displaying each of the credit score attributes used).

In the embodiment of FIG. 5B, some of the credit data for the consumer has been displayed and the consumer is provided with an option 410 to view debt services options that the consumer may be eligible for based on the consumer's credit data. The debt services options may vary depending on the consumer's credit data, debt score, or the debt services provider's eligibility requirements for debt services. In some embodiments, the determination of eligibility may be based on the consumer's generated debt score. In the example of FIG. 5B, Jane Smith's calculated debt score qualifies her for debt settlement. Therefore, one or more debt services options available to Jane Smith may be indicated in response to selecting the "View Debt Services Available" option 410.

Figures 6A, 6B:
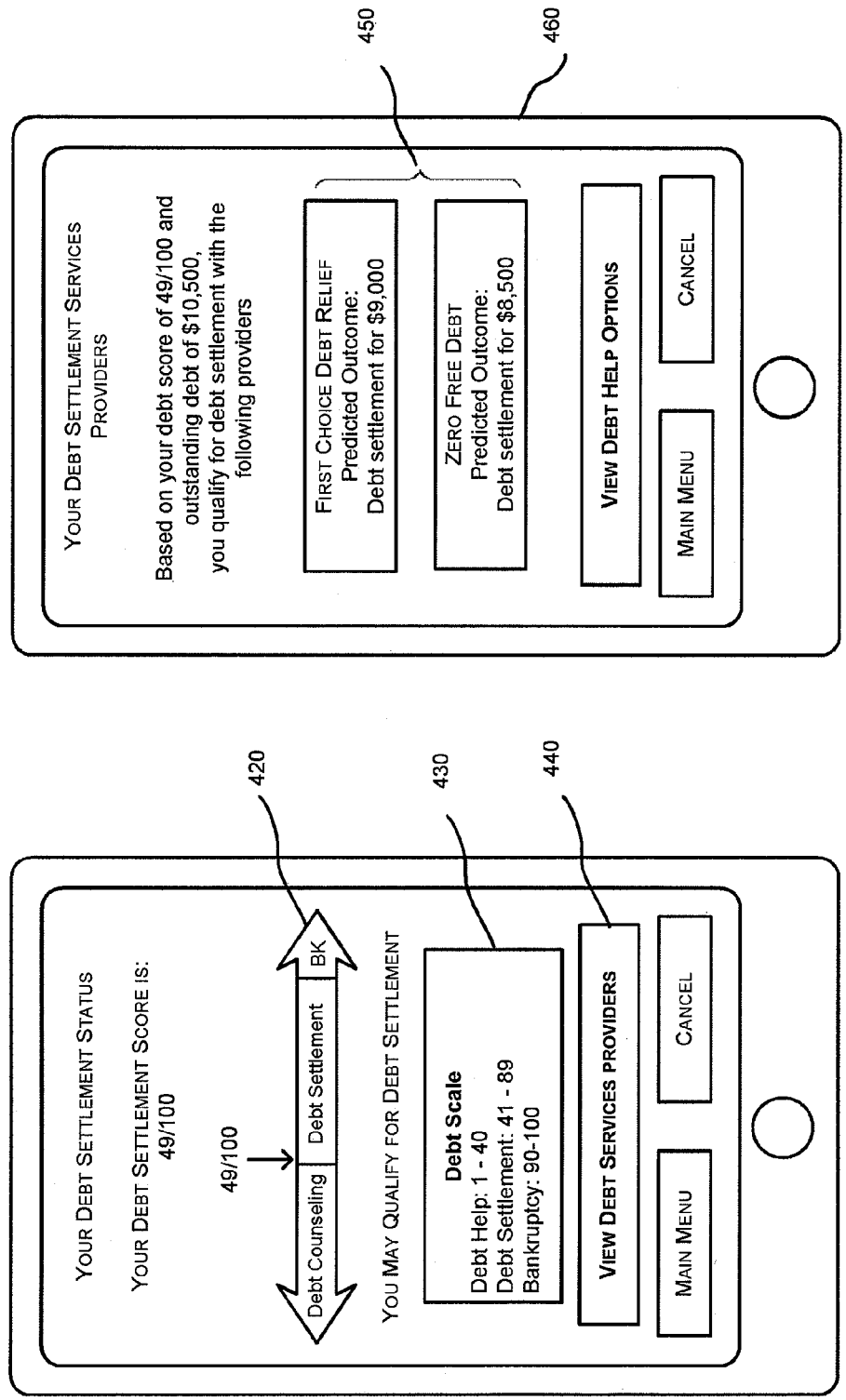
FIG. 6A is an illustrative user interface generated at least in part by a debt settlement candidate locator system that includes a debt scale displaying a range of debt services options.
FIG. 6B is an illustrative user interface generated at least in part by a debt settlement candidate locator system that includes available debt services providers and the predicted outcome of debt settlement with the available providers.

In some embodiments, a user interface displaying certain credit data of the consumer (e.g., FIG. 5B), may be bypassed so that the consumer goes directly from authorizing access to credit data (e.g., FIG. 5A), to viewing a debt score and/or credit services options available to the consumer based on the consumer's credit data and/or calculated debt score (e.g., FIGS. 6A and 6B).

In some embodiments, the manner in which the user interacts with the mobile application may be different. For example, the user may use touch screen input such as gestures to control the interface.

FIG. 6A illustrates a user interface that displays a consumer's debt score. This score is generated by the locator system 100 and is placed on a debt scale 420 which displays the user's eligibility for debt services, such as debt help, debt settlement, and/or bankruptcy. Debt scale ranges 430 indicate debt score ranges associated with each of multiple debt services. Thus, in embodiment of FIG. 6A, where lower debt scores indicate stronger financial health, a debt score from 1-40 indicates likely qualification for debt help, a debt score between 41-89 indicates likely qualification for debt settlement, while a debt score between 90-100 indicates likely qualification for accuracy. In other embodiments, any other scoring range may be used, such as a range from 320-820, 0-10, A-F, and the like. Additionally, in different embodiments lower debt scores may indicate weaker financial help, such as the lowest scores being indicative of qualification for bankruptcy.

Depending on the embodiment, the debt scale 420 and debt scale ranges 430 may be based on averages across multiple debt services providers, such as may be compiled by the locator system 100 or another entity. In other embodiments, the debt scale 420 is based on ranges provided by debt services providers that are currently offering services to consumers. Thus, the consumer is provided with indications of likely qualification for only those debt services to which a debt services provider is currently available. In some embodiments, the consumer may select a particular debt services provider and be provided with the debt scale associated with that particular debt services provider. Alternatively, the consumer may select debt services providers within a particular geographic region around the consumer, such as within the same state as the consumer. In any of these embodiments, the debt scores may be based on different algorithms, such as debt score algorithms associated with one or more selected debt services provider.

In this embodiment, the user can elect to view and/or engage one or more debt services providers that offer the debt services for which the consumer is likely qualified. For example, the consumer may select button 440 in order to receive a list of one or more debt services providers associated with the particular debt services for which the consumer is likely qualified.

FIG. 6B illustrates a user interface that displays the available debt services providers based on a consumer's credit data and/or debt score. In the example of FIG. 6B, the consumer's credit data and/or debt score qualifies the consumer for debt settlement with the displayed debt services providers 450. In one embodiment, the user interface may display predicted debt settlement outcomes based on the user's selected debt settlement services option. In the example of FIG. 6B, the user interface displays the corresponding predicted outcomes for each of the displayed debt services providers 450. In some embodiments, the predicted outcome can be in the form of a percentage, rating, or another indicator. In one embodiment, the predicted outcome can be based on the debt score, outstanding debt, or other custom credit data from the debt services provider. If the user chooses not to proceed with debt settlement, the user can view debt help options 460 (or some other debt services options). In some embodiments, the generated results from the user interface can be stored for a period of time (e.g., a day or a week). The user can then easily access the results upon revisiting the user interface.

In one embodiment, the debt service provider (e.g., either operated by the same entity as the candidate locator system 100, or a separate entity) negotiates with the creditors to have the debt settlement report to credit bureaus as "paid as agreed," by virtue of the new agreements between the consumer and lenders/creditors. Such debt settlement may have a reduced (or no) impact on the consumers' credit report/score, as compared to the typical "account settled" status that is reported to credit bureaus when accounts are settled via debt settlement series, which may have a negative impact on the consumers' credit report/score. In one embodiment, creditors are more willing to report the settlement as "paid as agreed" in view of the prescreening of the consumers for settlement eligibility (e.g., as discussed above) and/or the streamlining of information exchange that is possible through use of consumer information extracted from credit reports of the consumers.

FIG. 7 illustrates an online user interface that allows a consumer to input identifying information and authorize access to the consumer's credit data. The consumer provides personal information and then selects checkbox 510 to authorize the locator system to access credit data of the consumer. Once the information is provided and the authorization checkbox 510 is checked, the consumer can select button 500 in order to initiate generation of the consumer's debt settlement status. In one embodiment, the consumer can request to view the debt settlement status in conjunction with any other financial management or debt settlement program.

Figure 8:
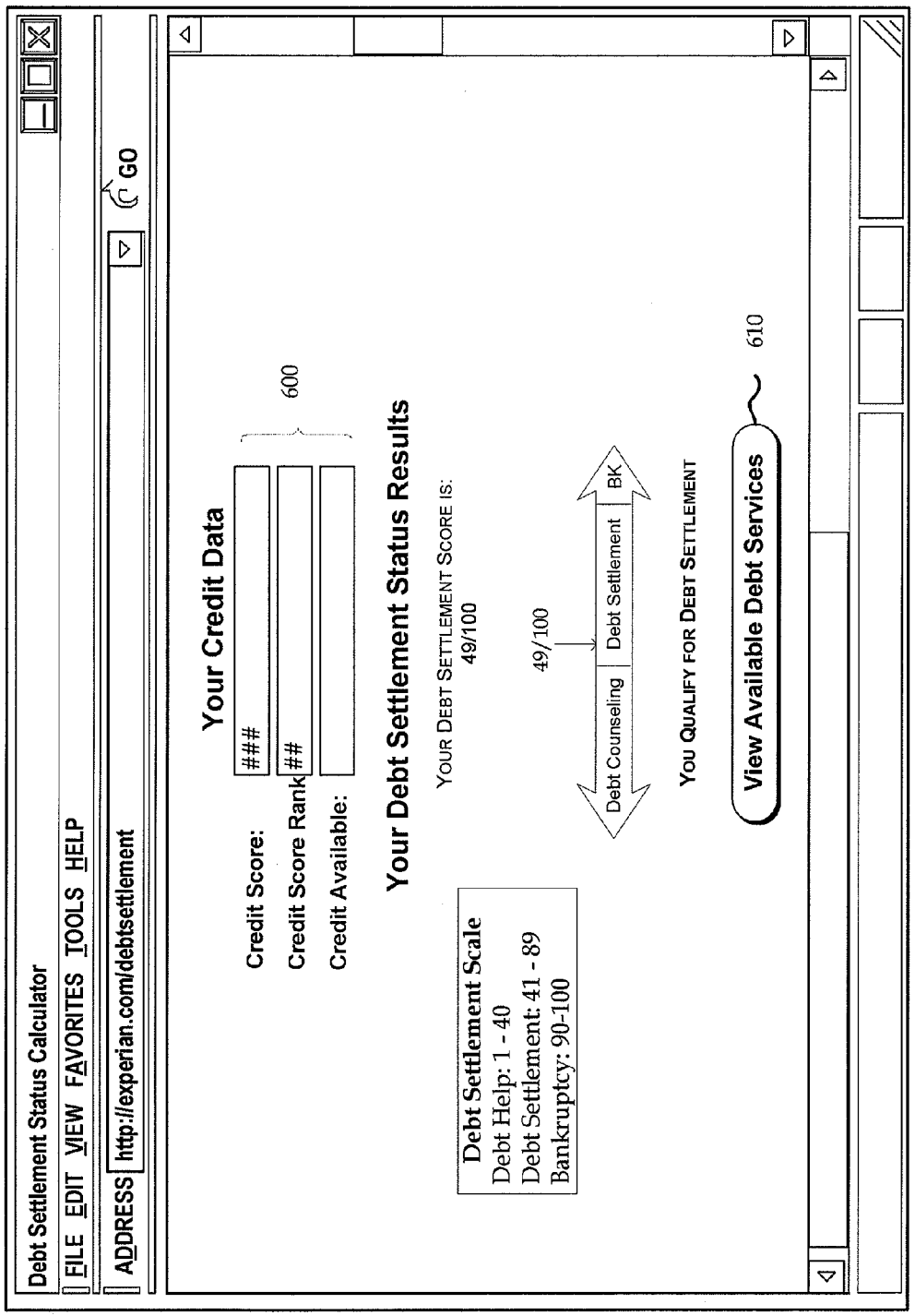
FIG. 8 is an illustrative webpage user interface generated at least in part by a debt settlement candidate locator system that includes a debt scale displaying a range of debt services options.

FIG. 8 illustrates an online user interface that displays the user's credit data, debt score, and debt services for which the consumer may qualify. In some embodiments, the displayed variables 600 will be custom credit data attributes that are used by a particular one or more debt services provider to determine the consumer's eligibility for debt services options. For example, debt services providers that are available to provide debt services in a particular geographic region of the consumer may have a particular preference for credit data attributes that should be used in determining eligibility for debt services and/or a debt score for consumers within that area.

In some embodiments, credit data may also include data that is derived from credit data of consumers, such as a credit score rank that is indicative of a particular consumers credit score relative to a group of consumers. Credit score rank may rank a consumer's credit score in view of other consumers for which a particular requesting entity has previously provided a particular debt service. For example, the locator system 100 may be provided with information from a particular debt settlement company regarding credit scores of consumers that have been successfully provided debt settlement (or other debt services) from the debt settlement company. Thus, the locator system 100 may rank a particular consumer's credit score relative to the actual credit scores of consumers that have actually received the corresponding debt service from the debt settlement provider. In some embodiments, consumers are ranked with reference to a larger group of consumers credit scores. For example, a credit score rank may be with reference to all credit scores, or all credit scores of consumers having a particular demographic (or other) characteristic, such as consumers within a particular state, region, age range, etc. In some embodiments, more than one credit score ranking may be used in a debt score algorithm.

In some embodiments, the debt services information provided in response to the consumer selecting the view available debt services button 610 will vary depending on the consumer's credit data, debt score, and/or particular preferences of debt services companies. In this embodiment, the consumer may request to view debt services and will be directed to debt settlement services options.

Figure 9:
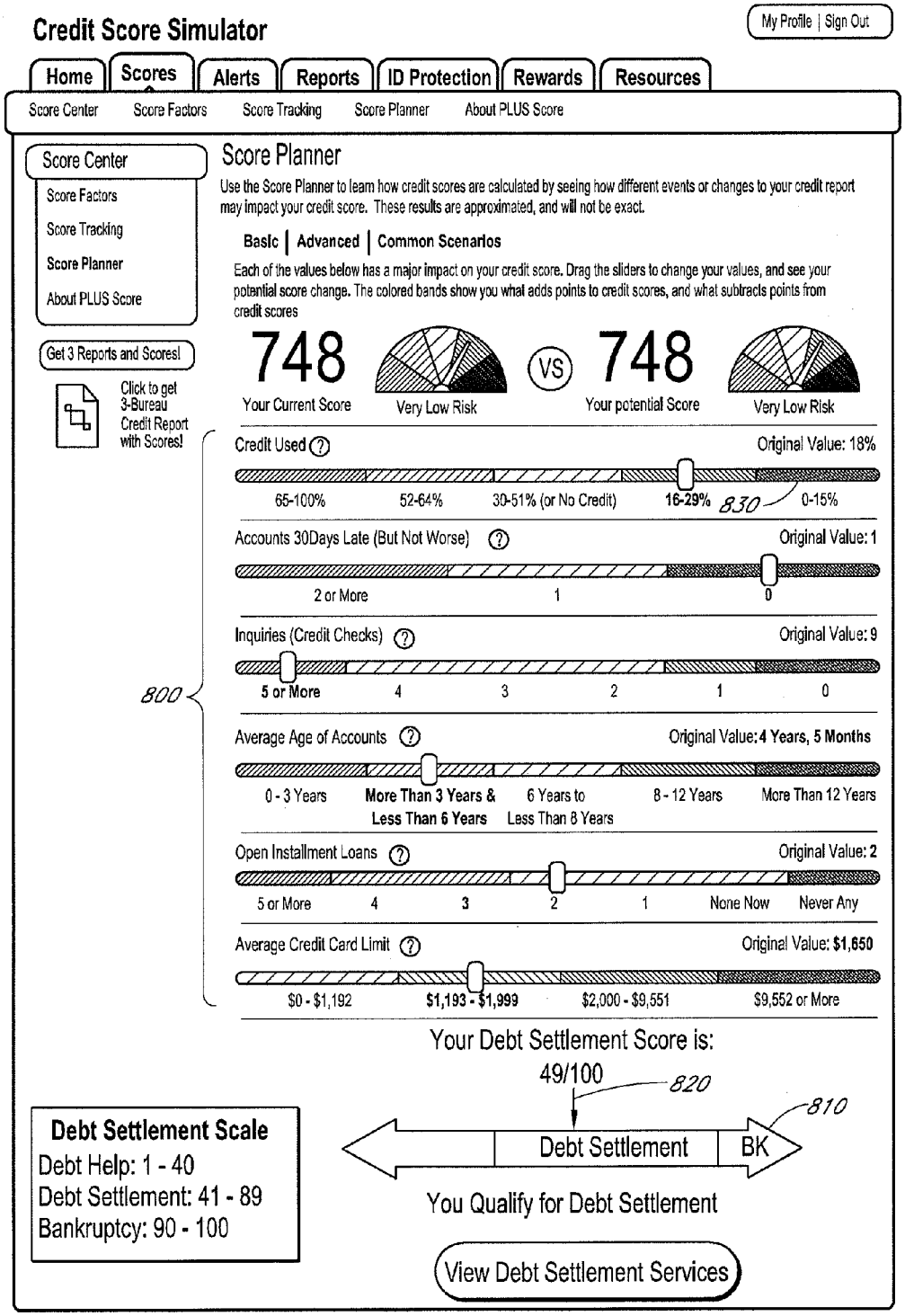
FIG. 9 illustrates one embodiment of the debt settlement candidate locator system used in conjunction with a credit score planner.

FIG. 9 illustrates a sample user interface of the debt settlement candidate locator system used in conjunction with a credit score simulator. In this embodiment, a consumer can modify various credit data variables 800 to view the corresponding change in the debt score indicator 820. This allows consumers to modify credit variables in order to initiate calculation of a simulated credit score based on those modified credit variables, as well as a simulated debt score based on those modified credit variables and/or the simulated credit score. For example, the simulated credit scores (and/or modified credit variables) may be provided to the locator system 100, which uses them to calculate a simulated debt score. For example, if the consumer is close to being eligible for debt settlement (e.g. has a debt score that is only one away from the indicated range of scores for debt settlement eligibility), the consumer can move various of the sliders 800 in order to determine how such adjustments would not only affect the consumer's credit score, but also the consumer's eligibility for debt settlement (e.g., so that the consumer can lower the debt score by at least one to qualify for debt settlement). Thus, the consumer may identify changes to the indicated credit variables that will either increase or decrease the consumer's debt score, as desired by the particular consumer (e.g., some consumers may want to decrease their debt score in order to qualify for a particular debt service, while others may want to increase their debt score in order to move further away from debt services.).

In another embodiment, a consumer can modify the debt score indicator 820 and view corresponding exemplary changes in the credit data variables 800 that would cause the consumer to have the modified debt score. For example, if the consumer moves debt score indicator 820 to indicate a different debt score, this may cause other sliders 800 or interface elements to change their colored segments and/or values. Because there may be multiple different combinations of the credit data variables that will result in a particular selected debt score, in one embodiment the consumer can adjust a particular credit data variable in order to cause other credit data variables to correspondingly move in order to maintain the selected debt score.

In other embodiments, the debt settlement candidate locator can be used in conjunction with any other financial management or debt settlement program. The user interfaces presented by the webpage may be similar to the mobile device interfaces described above, or they may be adjusted to comport with the specifications and features of the device.

Other

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of identifying and locating debt settlement candidates, the method comprising:
   receiving a request for a debt score for a consumer;
   accessing, from an electronic data store, credit data of the consumer;
   calculating, with one or more hardware computer processors, a debt score based on at least the accessed credit data of the consumer, wherein the debt score is within a debt score range including at least two sub-ranges associated with corresponding debt services, wherein the debt score is usable to determine a likelihood of the consumer being eligible for each of multiple debt services; and
   providing a requesting entity with the debt score and/or the debt service associated with the sub-range of the calculated debt score.

2. The method of claim 1, wherein the debt services include a debt help service.

3. The method of claim 1, wherein the debt score services include bankruptcy approval.

4. The method of claim 1, wherein the debt score is calculated based on one or more attributes of the credit data that have been pre-selected by the requesting entity.

5. The method of claim 1, wherein the debt score is calculated based on two or more of:
   a credit score rank,
   a credit score,
   a ratio of revolving credit to debt,
   an amount of credit available,
   a quantity of delinquent accounts,
   a quantity of negative accounts,
   an average age of tradelines in the credit data, or
   a quantity of negative information in the credit data.

6. The method of claim 1, wherein the debt score is further calculated based on one or more of:
   public record, debit, demographic, or psychographic information associated with the consumer.

7. The method of claim 5, wherein the credit score rank is a percentage based on a comparison of the consumer's credit score with an average of a plurality of consumer credit scores.

8. The method of claim 1, wherein the debt score is usable to estimate an outcome of the debt service associated with the sub-range of the calculated debt.

9. The method of claim 1, wherein the calculated debt score is based on at least the accessed credit data of the consumer and a credit score ranking of the consumer, wherein the credit score ranking indicates a relationship between the credit score of the consumer and credit scores of a plurality of other consumers.

* * * * *